US011286636B2

(12) United States Patent
Bartminn et al.

(10) Patent No.: US 11,286,636 B2
(45) Date of Patent: Mar. 29, 2022

(54) SOFT-SOFT FOUNDATION FOR OFFSHORE STRUCTURES

(71) Applicants: Daniel Bartminn, Elmshorn (DE); Bernadette Zipfel, Hamburg (DE)

(72) Inventors: Daniel Bartminn, Elmshorn (DE); Bernadette Zipfel, Hamburg (DE)

(73) Assignee: innogy SE, Essen (DE)

( * ) Notice: Subject to any disclaimer, the term of this patent is extended or adjusted under 35 U.S.C. 154(b) by 0 days.

(21) Appl. No.: 16/851,499

(22) Filed: Apr. 17, 2020

(65) Prior Publication Data

US 2020/0240102 A1 Jul. 30, 2020

Related U.S. Application Data

(63) Continuation of application No. PCT/EP2018/075888, filed on Sep. 25, 2018.

(30) Foreign Application Priority Data

Oct. 19, 2017 (DE) .................... 10 2017 124 412.3

(51) Int. Cl.
*E02D 31/08* (2006.01)
*F03D 13/25* (2016.01)
(Continued)

(52) U.S. Cl.
CPC ............ *E02D 31/08* (2013.01); *E02D 27/50* (2013.01); *E02D 27/525* (2013.01); *F03D 13/25* (2016.05);
(Continued)

(58) Field of Classification Search
CPC .. F03D 13/22; F03D 13/25; E02B 2017/0091; E02D 27/425; E02D 27/52; E02D 31/08
See application file for complete search history.

(56) References Cited

U.S. PATENT DOCUMENTS 4,406,094 A * 9/1983 Hempel .................. E02D 27/42
52/40
4,895,481 A 1/1990 Pepin-Lehalleur et al.
(Continued)

FOREIGN PATENT DOCUMENTS

DE 3007442 * 9/1981 ........... E02D 27/425
DE 3 414 706 A1 10/1985
(Continued)

OTHER PUBLICATIONS

Google Patent Translation, EP2522850, Nov. 14, 2012.*

*Primary Examiner* — Frederick L Lagman
(74) *Attorney, Agent, or Firm* — Reinhart Boerner Van Deuren P.C.

(57) ABSTRACT

A foundation for an offshore structure is disclosed. The foundation includes a tower having an anchoring portion anchored in the seabed and a connecting portion arranged at the opposite end. The foundation also includes a power generation system arranged above the water surface connected to the connecting portion of the tower. A natural frequency of the offshore structure lies below an excitation component one times the rotational frequency 1P of at least one exciting component. The foundation also includes at least one restoring element connected to the tower via one or more transition pieces. The restoring element is designed such that, in a skewed position of the tower, tensile and/or compressive forces can be transferred to the tower by means of the restoring element such that the tower can be straightened up.

14 Claims, 9 Drawing Sheets

(51) Int. Cl.
  *E02D 27/42* (2006.01)
  *E02D 27/52* (2006.01)
  *E02D 27/50* (2006.01)
  *E02D 27/12* (2006.01)
  *E02B 17/00* (2006.01)

(52) U.S. Cl.
  CPC ...... *E02B 2017/0091* (2013.01); *E02D 27/12* (2013.01); *E02D 27/425* (2013.01); *E02D 2200/146* (2013.01); *E02D 2200/1607* (2013.01); *E02D 2600/40* (2013.01)

(56) References Cited

U.S. PATENT DOCUMENTS

| | | | | |
|---|---|---|---|---|
| 6,891,280 | B2* | 5/2005 | Siegfriedsen | F03D 7/0296 290/44 |
| 7,877,933 | B2* | 2/2011 | Watchorn | E02D 27/425 52/40 |
| 8,876,486 | B2* | 11/2014 | Tosello | F03D 13/22 416/246 |
| 2007/0001464 | A1* | 1/2007 | Kothnur | F03D 13/22 290/55 |
| 2007/0110578 | A1* | 5/2007 | Stommel | F03D 80/00 416/132 B |
| 2008/0118342 | A1* | 5/2008 | Seidel | F03D 7/0224 415/1 |
| 2011/0056151 | A1* | 3/2011 | Marmo | F03D 13/20 52/167.4 |
| 2011/0133475 | A1* | 6/2011 | Zheng | E04H 12/10 290/55 |
| 2011/0204636 | A1* | 8/2011 | Scholte-Wassink | H02P 9/008 290/44 |
| 2012/0073487 | A1* | 3/2012 | Pantaleon Prieto | B63B 35/44 114/264 |
| 2012/0107116 | A1* | 5/2012 | Obrecht | F03D 7/0296 416/1 |
| 2014/0219797 | A1* | 8/2014 | Friedrich | F03D 13/22 416/1 |
| 2015/0211484 | A1* | 7/2015 | Couchman | F03D 13/20 416/1 |
| 2015/0308139 | A1* | 10/2015 | Wagner | E04C 5/08 52/1 |
| 2015/0354532 | A1* | 12/2015 | Nielsen | F03D 13/25 416/9 |
| 2019/0127032 | A1* | 5/2019 | Prieto | F03D 13/25 |

FOREIGN PATENT DOCUMENTS

| | | | |
|---|---|---|---|
| EP | 1 008 747 A2 | 6/2000 | |
| EP | 1008747 | * 6/2000 | ............ F03D 9/12 |
| EP | 2 522 850 A2 | 11/2012 | |
| EP | 2685093 A1 | * 1/2014 | ............ F03D 9/12 |
| JP | 2001-241374 A | 9/2001 | |
| JP | 2013-160109 A | 8/2013 | |
| JP | 2014-101792 A | 6/2014 | |
| JP | 2014-111924 A | 6/2014 | |
| JP | 2016-022783 A | 2/2016 | |
| JP | 2016-094929 A | 5/2016 | |
| JP | 2016-156381 A | 9/2016 | |
| JP | 2016-199874 A | 12/2016 | |

* cited by examiner

SOFT-SOFT FOUNDATION FOR OFFSHORE STRUCTURES

CROSS-REFERENCE TO RELATED PATENT APPLICATIONS

This patent application is a continuation of International Patent Application No. PCT/EP2018/075888, filed Sep. 25, 2018, which claims the benefit of German Patent Application No. 10 2017 124 412.3, filed Oct. 19, 2017, the entire teachings and disclosure of which are incorporated herein by reference thereto.

FIELD

The invention relates to a foundation for an offshore structure and a method for the design of such a foundation for an offshore structure.

BACKGROUND

Foundations or foundation structures for offshore structures, in particular offshore wind turbines, are generally designed with regard to their natural frequency in such a way that they do not overlap with other frequency exciting component bands, e.g. that of the rotor of a turbine used as a power generation system, as far as possible. As a rule, in the case of a so-called monopile as the tower of such a wind turbine, a natural frequency f is selected which lies between a 1P and a 3P frequency band, the 1P frequency band corresponding to an exciting component from one times the rotational frequency, and the 3P frequency corresponding to an exciting component three times the rotational frequency of the rotor of the turbine. In particular, in order to avoid resonance vibrations, an attempt is made to design the natural frequency of the offshore structure, e.g. at least 10% above the 1P and below the 3P frequency band. The design of such "stiff" towers or piles of an offshore structure is also called "soft-stiff".

In particular for offshore wind turbines, ground foundations have been used so far, with which a natural frequency above the 1P frequency band can be achieved. Other frequency bands of the natural frequency of an offshore power system have so far been avoided for the following reasons: (i) Possible dynamic wave exciting component and resulting fatigue loading or resonance of the tower structure of the offshore structure;
(ii) In particular, turbines of an offshore wind turbine regularly allow only small tolerances with regard to long-term skew (e.g. caused by a tidal range of the sea state prevailing in the offshore area); and
(iii) Soft structural foundations often contradict standardized verification criteria of geotechnical engineering.

Furthermore, floating foundations are known to accommodate a tower structure from an offshore wind turbine, wherein these foundations usually require water depths of more than 20 m, or preferably even more than 40 m. Floating foundations of this type for use in offshore wind turbines also require complex anchoring systems and flexible floating cable guides.

Sometimes, in coastal waters, in which often a water depth of about 40 m is not exceeded, and which also do not allow, for example, a floating foundation for a tower of an offshore wind turbine due to soft ground and a lack of water depth, a floating foundation for a tower of an offshore wind energy plant can only be made possible by very cost-intensive solutions or have been dispensed with for this reason.

From EP 2 522 850 A2, a tower vibration absorber for a tower or wind turbine is known, which has a first pendulum with a first pendulum length and a first mass, which is designed as a hanging pendulum. For a flexible adjustment of a resonance frequency of the tower vibration absorber and for achieving a low natural frequency at a low overall height, the tower vibration absorber has a second pendulum with a second pendulum length and a second mass, which is designed as a standing pendulum, the masses being coupled to one another in the direction of action via at least one coupling element.

SUMMARY OF SOME EXEMPLARY EMBODIMENTS

It would be desirable, in particular in coastal waters wherein a water depth of about 40 m is often not exceeded, to be able to provide a cost-effective solution for a foundation for an offshore structure, in particular an offshore wind turbine, which is tolerant of large deflections in particular and can withstand extreme loads due to its high deformability.

Based on the background of the described prior art, it is therefore the object to reduce or avoid the described problems at least partially, i.e. in particular to provide a low-cost option for the foundation of an offshore structure that is tolerant of large deflections and can withstand extreme loads due to its high deformability.

This object is solved by a foundation as described herein.

In the following some exemplary embodiments are described in more detail:

An offshore structure is, for example, a wind turbine installed offshore. Furthermore, an offshore structure can be, for example, a transformer station, or a drilling or production platform.

Certain offshore structures, in particular wind turbines, are regularly fixed to the seabed with a foundation. A common type of foundation for wind turbines, for example, is a so-called monopile, wherein the tower of the wind turbine extends to the seabed and an anchoring portion is anchored in the seabed. The tower is then completely held in the seabed by its anchorage or anchoring portion.

In order to be tolerant of large deflections, and also to be able to escape extreme loads by a high degree of deformability, the foundation must allow for a large movement of the offshore structure. Offshore structures whose natural frequency lies above the 1P frequency band do not allow this.

In contrast, the anchoring portion of the tower according to the subject extends less deep into the seabed, and without additional fastening and/or stabilizing elements, the tower would not be stable against tipping, i.e. could tip over. Correspondingly, the foundation comprises at least one restoring element, the at least one restoring element being designed (e.g. geometrically) in such a way that in the event of an skewed position of the tower, in which the longitudinal extending axis of the tower ends outside of a vertically extending axis, tensile and/or compressive forces can be transferred to the tower by the at least one restoring element, so that the tower can be straightened up. In this way, the tower is tilt resistant.

The foundation allows a strong deflection of the tower, wherein a corresponding offshore structure has a natural frequency lying below the 1P frequency band.

For example, the tower has such a length that at least one lower end (e.g. part of the anchoring portion) of the tower engages with the seabed. For example, the lower end does not penetrate the seabed as deeply as is necessary with a stiff foundation (e.g. if only the bottom of a monopile is used).

For example, the tower consists of a reinforced concrete and/or includes a steel foundation. Furthermore, the tower can be made of, or at least partially comprise, a glass fiber composite material, or a carbon composite material, to name but a few non-limiting examples.

In an exemplary embodiment according to all aspects, the offshore structure comprises a power generation system and the foundation, wherein the natural frequency lies below an exciting component from one times the rotational frequency 1P of at least one rotating exciting component that can be connected to the power generation system.

The exciting component is, for example, at least one rotor blade of a wind turbine that can be connected to the power generation system. In this case, the power generation system is, for example, a turbine of the wind turbine.

A limitation of the natural frequency of the offshore structure can be achieved, for example, by clamping at least a part of the tower in the seabed. Basically, the natural frequency increases (firstly, shifts further into the 1P frequency band, then in the direction of the 3P frequency band (corresponds to the exciting component three times the rotational frequency of at least one exciting component, e.g. at least one rotor blade of a wind turbine) and then beyond the 3P frequency band).

A further limitation of the natural frequency of the offshore structure can, for example, be achieved by changing the diameter of the tower, wherein the larger the diameter of the tower increases the natural frequency, thus the higher the natural frequency of the offshore structure (shifting the natural frequency of the offshore structure towards the 3P frequency band and beyond).

The foundation is therefore a combination of a monopile foundation type (ground-based foundation) and a floating foundation, and can be described, for example, by the term "semi-floating base" or "semi-floating foundation".

In an objective embodiment according to all aspects, the natural frequency of the offshore structure lies below a frequency of 0.1 Hz.

If the natural frequency of the offshore structure lies below the 1P frequency band, a soft structure is designed per se. Accordingly, the natural frequency of the offshore structure lies deliberately below the regularly aimed frequency band, which lies between the 1P and 3P frequency band. The objective foundation strives for a natural frequency of less than 1P and less than JONSWAP (<1P<JONSWAP=0.1 Hz), in particular in the case of high structures (height of the offshore structure) and an arrangement of the offshore structure in deep waters. JONSWAP refers to an exciting component of the offshore structure by the prevailing sea state and optionally also the tidal range.

In order that extreme skewed positions can be avoided or compensated for in the short and long term, the foundation comprises at least one restoring element, such as buoyancy bodies, (geometric, e.g. bellied) spring elements, flexible anchorages (e.g. rope anchorages), or a combination thereof, to name but a few non-limiting examples.

An exemplary embodiment according to all aspects provides that the anchoring portion of the tower that can be anchored in the seabed engages in the seabed, wherein when the tower is in a skewed position, the anchoring portion of the tower that engages in the seabed can be moved in the seabed.

Accordingly, the anchoring portion may move, for example, in the direction of two degrees of freedom within the seabed. Movement in the direction of the two degrees of freedom occurs, for example, within an essentially horizontal plane. For example, if the tower is in a skewed position, caused by a tilting of the tower, such a movement of the anchoring portion of the tower can occur in at least one direction within these two degrees of freedom. In addition, the anchoring portion of the tower may, for example, have one or more holes through which at least parts of the seabed can flow or pass when the anchoring portion moves in the seabed. It is understood that in this case the seabed has a soft structure (e.g. due to water saturation), so that accordingly at least parts of the seabed can pass through the hole or holes formed in the anchoring portion.

An embodiment according to all aspects provides that the skewed position of the tower (2) relative to the sea bed (M), which occurs in a limit state of the load-bearing capacity of the foundation, is greater than 0.10°, in particular greater than 0.20° and in particular greater than 0.5°, and the skewed position after a cyclic loading is greater than 0.05°.

The ultimate limit state is also referred to as ULS loads (Ultimate Limit State). The skewed position relative to the seabed and the skewed position after cyclic loading refers to a theoretical consideration, wherein in this theoretical consideration, for example, the at least one restoring element is not taken into account.

Furthermore, the ultimate limit state does not converge at an iterative calculation in which the skewed position of the tower relative to the seabed is greater 0.10°, in particular greater than 0.20° and in particular greater than 0.5°, and the skewed position is more than 0.05° after a cyclical load. Also these iterative calculation is performed without consideration of the at least one restoring element that counteracts any tilting of the tower that may have occurred.

In an embodiment according to all aspects, an upper portion of the tower is movable relative to the anchoring portion of the tower, wherein in the case of a skewed position of the tower, the anchoring portion in the seabed remains substantially in its position For example, a foundation joint is formed between the upper portion and the anchoring portion of the tower. This foundation joint may be sprung and/or damped, for example by means of spring and/or damping elements arranged accordingly or comprised by the foundation joint, which stiffens the tilting stability of the tower.

The upper portion of the tower is movable relative to the anchoring portion of the tower, for example, in the direction of at least two degrees of freedom, e.g. for tilting the tower in the direction of a horizontal plane of the tower arranged substantially vertically.

An exemplary embodiment according to all aspects provides that the anchoring portion of the tower is essentially hollow cylindrical.

Accordingly, the anchoring portion of the tower is anchored in the seabed in such a way that parts of the seabed fill the hollow cylindrical area of the anchoring portion. This allows a better anchoring of the anchoring portion in the seabed, and thus of the offshore structure.

In a further embodiment according to all aspects, the upper portion of the tower is movably mounted at least partially within and in a receiving area of the anchoring portion of the tower, wherein in particular the anchoring portion of the tower in the receiving area is filled with a filling material.

The movable support of the upper portion of the tower in the receiving area of the anchoring portion of the tower, in which the upper portion of the tower can be received, is realized, for example, by a formed foundation joint. As already described above, this foundation joint can be sprung and/or damped, for example by means of one or more spring and/or damping elements arranged accordingly or comprised by the foundation joint.

An exemplary embodiment according to all aspects provides that the upper portion of the tower extends conically from the tower within the receiving area of the anchoring portion.

The anchoring portion of the tower, for example, is hollow or hollow cylindrical, so that the upper portion of the tower can engage with the anchoring portion of the tower. The upper portion of the tower, for example, has a cylindrical shape that tapers down into the anchoring portion.

For example, the anchoring portion of the tower is at least partially penetrating or projecting into the seabed, and the upper portion of the tower is located above the seabed. Alternatively, the anchoring portion of the tower is arranged so as to be fully penetrating the seabed and the upper portion of the tower is arranged within the anchoring portion so that at least part of the upper part of the tower within the anchoring portion also penetrates the seabed, surrounded by the anchoring portion.

In an embodiment according to all aspects, the receiving area of the anchoring portion of the tower has at least one spring and/or damping element, so that when the upper portion of the tower moves relative to the anchoring portion of the tower, the upper portion of the tower can be sprung and/or damped.

The at least one spring and/or damping element can for example spring and/or damp the foundation joint. By means of at least one spring and/or damping element, for example, the tilting stability of the tower can be stiffened.

An exemplary design of the object according to all aspects provides that the at least one restoring element comprises at least one buoyancy body or is designed as at least one buoyancy body, wherein in particular the at least one buoyancy body has a substantially conical or curved geometry.

Due to the design of the foundation in such a way that the offshore structure has a natural frequency below the 1P frequency band, it may be necessary, in particular to prevent the offshore structure from lowering or sinking, that at least one buoyancy body is comprised by the foundation. Overall, the forces resulting from anchoring the foundation in the seabed and the at least one buoyancy body must counteract the weight of the offshore structure.

The deeper the anchoring portion of the tower engages in the seabed, the less buoyancy is required from the at least one buoyancy body, for example, to prevent the offshore structure from lowering or sinking.

Furthermore, a lower natural frequency of the offshore structure results from the buoyancy caused by the at least one buoyancy body, which allows a limitation of the natural frequency. This is particularly due to the semi-floating foundation of the offshore structure.

In a further embodiment according to all aspects, the at least one buoyancy body is arranged below the water surface and at least partly surrounding the tower in a horizontal plane.

Alternatively, when the tower is in an upright position, at least one buoyancy body is arranged resting on the waterline. For example, the at least one buoyancy body may be arranged at at least one arm extending from the outer wall of the tower.

An exemplary embodiment according to all aspects provides that the at least one restoring element comprises one or more anchors, the one or more anchors being connectable to the seabed and being connected to the tower in each case by means of a flexible connection, which, when the tower is in a skewed position, generate a restoring tensile and/or compressive force in the opposite direction to the skewed position by tightening the flexible connection.

The flexible connection is, for example, a chain or a rope, which form a so-called chain line. When the tower is in a skewed position, the flexible connection causes, for example, a restoring tensile and/or compressive force, e.g. a cable and/or chain force in the opposite direction to the skewed position by tightening this chain line.

For example, the one or more anchors together with the respective flexible connections form an anchor system.

In an embodiment according to all aspects, the at least one restoring element comprises one or more stabilizing arrangements or is designed as one or more stabilizing arrangements, preferably the one or more stabilizing arrangements being extendable from the tower, or preferably being integrated gyro stabilizers.

Alternatively, one or more stabilizing arrangements are permanently installed on the tower.

In a further embodiment, the at least one restoring element is a mechanical anchoring system. Such a mechanical anchoring system comprises, for example, one or more anchor ropes, the one or more anchor ropes being connected, for example, to so-called suction buckets and/or piles. The suction buckets and/or the piles enable (additional) anchoring to the seabed.

An exemplary embodiment according to all aspects provides that that the center of gravity of the offshore structure is designed in such a way that fractions of a ground dead weight and ground friction forces of the seabed to be overcome are below the center of gravity of a liquid displaced by the foundation.

By arranging the center of gravity of the offshore structure in this way, the offshore structure becomes less sensitive to forces acting on the offshore structure in order to tilt it. The lower the center of gravity can be located, the greater is the stability of the offshore structure against tipping over. However, in particular in the case of offshore structures designed as offshore wind turbines, a low arrangement of the center of gravity is sometimes challenging, as the power generation unit located at the top of the tower, comprising e.g. a turbine and several rotor blades, and the high weight of the power generation unit shift the center of gravity upwards in the vertical direction.

A resetting effect is created, for example, by placing the center of gravity below a pivot point. It is therefore advantageous in a further possible embodiment to shift the overall center of gravity downwards, e.g. into the lower part of a hollow profile placed in the ground, which represents the anchoring portion, for example. This can also be carried out subsequently, for example, after a foundation has already been arranged in the seabed, e.g. with a cement suspension and/or grouting in the hollow portion.

A further exemplary design according to all aspects is characterized in that the resulting center of gravity of the offshore structure lies below the center of gravity of form or buoyancy, taking into account the ground reaction forces and the ground dead weight mobilized, e.g. by skin friction A further exemplary design according to all aspects is characterized by in that, taking into account the ground reaction forces and the ground dead weight mobilized e.g. by shell friction, the resulting center of gravity of the offshore structure lies below the pivot point.

A further exemplary embodiment according to all aspects is characterized in that, taking into account the ground reaction forces and the ground dead weight mobilized e.g. by shell friction, the resulting center of gravity of the offshore structure lies below the metacenter.

For example, the foundation may be at least partially, i.e. not completely, a floating body. For example, the metacenter is the interportion of the buoyancy vectors belonging to two adjacent angular positions. There is a metacenter for each axis of rotation and each angular position (when the tower is tilted).

Another exemplary embodiment according to all aspects is characterized in that the center of gravity of the offshore structure is designed in such a way that the center of gravity lies below the center of rotation and/or the metacenter is above the center of gravity of weight.

A further exemplary embodiment according to all aspects is characterized in that, taking into account hydrostatic suction forces generated between the ground (seabed) and a foundation wall, e.g. by a movement of the foundation, which can optionally be generated additionally by an active pumping or by active pumping of ballast water, weight displacements of the tower of the foundation are possible, so that a force which resets when the tower is in a skewed position—in the present case e.g. the suction force or the suction forces—leads to the tower being straightened up.

A further exemplary embodiment according to all aspects provides that the anchoring portion of the tower is double-walled. For example, if the anchoring portion of the tower is anchored in a rigid seabed, movement of the bottom in a lateral direction (e.g. a turning movement) may cause the outer wall of the tower to detach from the bottom, creating suction and/or suction forces which in turn may cause restoring forces. This can also have a positive effect on the tilting stability of the tower of the foundation.

In an exemplary embodiment according to all aspects, the offshore structure is a wind turbine, the power generation system is a turbine and the rotating component is at least one rotor blade or comprises more than one rotor blades, wherein the at least one rotor blade can be connected to the turbine.

The object is further solved by an offshore structure, comprising the foundation.

The present object is further solved by a method according to a second aspect as described herein.

According to the second aspect, a method designing a foundation for an offshore structure, comprising:
  determining a natural frequency of the offshore structure comprising an foundation in such a way that the natural frequency lies below an exciting component one times the rotational frequency 1P of at least one exciting component;
  wherein the determining of the natural frequency is iteratively based at least partially on changing parameters of the foundation.

In a further embodiment according to the second aspect, the parameters include one or more of the following parameters i) to viii):
(i) water depth at the site of the offshore structure;
(ii) weight of power generation system (e.g. comprising turbine (also referred to as gondola) and/or rotor blades);
(iii) weight of tower (e.g. length of tower*material used);
(iv) total weight of the offshore structure;
(v) vertical stability (e.g. erosion over site (e.g. seabed))
(vi) Stability buoyancy (e.g. caused by buoyancy bodies);
(vii) restoring forces (e.g. stiff ground, movement of the ground in a lateral direction (turning, wherein the outer tower wall may become detached from the floor, thereby creating suction and/or suction forces, which in turn may create restoring forces, or tensile and/or compressive forces caused by at least one restoring element); and
(viii) costs of the offshore construction.

As a result, the method can determine, for example, a certain force information which is determined, for example, according to the formula of a combination of (+ground)+(−lift)=force required for stability. The force information can accordingly represent such a specific force.

In order to determine the natural frequency of the offshore structure, a first natural frequency can be determined based in particular on the tower weight (e.g. length and stiffness of the tower) and the fraction of the tower that is above the water level. Subsequently, further parameters can be used iteratively, for example by changing them: e.g. the possible anchoring depth of the foundation can be varied, or the buoyancy force caused by a buoyancy body, for example, can be varied. Each iteration provides a natural frequency of the offshore structure as a result, so that a design can be made to achieve a natural frequency of the offshore structure below the 1P frequency band while ensuring sufficient tilting stability through the at least one restoring element comprised by the foundation.

The method is an iterative method, for example.

Furthermore, this method allows a calculation on a first side, assuming a completely floating foundation, and on a second side, assuming such a small water depth that buoyancy is not sufficiently realizable, for example by at least one buoyancy body. An exemplary site according to the second side is given for example with a tidal range of about 5 m and a 10 m high sandbank: If there is no water (tidal range), the offshore structure can only be supported by the ground-based foundation.

The method can now determine, for example, whether the foundation is feasible despite the natural frequency of the offshore structure being below the 1P frequency band. For example, it could be that a water-saturated ground cannot guarantee sufficient stability of the offshore structure against tipping. The method can, for example, determine, based on one or more corresponding parameters that reflect this, whether the additional stability required can be guaranteed, for example, by one or more restoring elements (e.g. anchor chains).

Further, artificial hydrostatic solutions can be enabled, e.g. in the above example, a double wall of the pile which makes use of consciously generated suction/suction forces which can also guarantee the tilting stability of the offshore structure.

According to a third aspect of the invention, an apparatus is disclosed which is adapted or comprises corresponding means to carry out and/or control a method according to the second aspect. Apparatuses of the method referred to in the second indent are, in particular, one or more apparatuses referred to in the third aspect.

According to the third aspect of the invention, an alternative apparatus is also described, comprising at least one processor and at least one memory comprising computer program code, said at least one memory and said computer program code being adapted to perform and/or control with said at least one processor at least one method according to the second aspect. A processor is to be understood, for example, as a control unit, a microprocessor, a microcontroller, a digital signal processor (DSP), an application-specific integrated circuit (ASIC) or a field programmable gate array (FPGA).

For example, an exemplary apparatus further comprises means for storing information such as a program memory and/or a main memory. For example, an exemplary apparatus of the invention further comprises means for receiving and/or transmitting information via a network such as a network interface. For example, exemplary inventive apparatuses are interconnected and/or connectable via one or more networks.

An exemplary apparatus according to the third aspect is or comprises, for example, a data processing system which is set up in terms of software and/or hardware to be able to carry out the respective steps of an exemplary method according to the second aspect. Examples of a data processing system are a computer, desktop computer, server, thin client and/or portable computer (mobile device), such as a laptop computer, tablet computer, wearable, personal digital assistant or smartphone.

Further apparatuses may be provided, for example a server and/or, for example, a part or component of a so-called computer cloud, which provides data processing resources dynamically for different users in a communication system. In particular, a computer cloud is a data processing infrastructure according to the definition of the "National Institute for Standards and Technology" (NIST) for the English term "Cloud Computing". An example of a computer cloud is a Microsoft Windows Azure Platform.

According to the third aspect of the invention, a computer program is also described which comprises program instructions which cause a processor to perform and/or control a method according to the second aspect when the computer program is executed by the processor. An exemplary program according to the invention may be stored in or on a computer-readable storage medium comprising one or more programs.

According to the third aspect of the invention, a computer-readable storage medium comprising a computer program according to the third aspect is also described. A computer-readable storage medium can be designed as a magnetic, electrical, electro-magnetic, optical and/or other storage medium. Such a computer-readable storage medium is preferably representational (i.e. "touchable"), for example it is designed as a data carrier device. Such a data carrier device is for example portable or permanently installed in a device. Examples of such a storage device are volatile or non-volatile random access memory (RAM) such as NOR flash memory or sequential access memory such as NAND flash memory and/or read-only memory (ROM) or read-write memory. Computer-readable, for example, should be understood to mean that the storage medium can be read and/or written to by a computer or data processing system, for example by a processor.

According to a fourth aspect of the invention, a system is also described comprising a plurality of apparatuses which together perform a method according to the second aspect.

An exemplary system according to the fourth aspect comprises an exemplary apparatus, such as an electronic device or server, for carrying out an exemplary method according to the second aspect.

The exemplary embodiments of the present invention described above in this description are also to be understood as disclosed in all combinations with each other. In particular, exemplary embodiments are to be understood in terms of the different aspects disclosed.

In particular, the prior or subsequent description of method steps according to preferred embodiments of a method should also disclose corresponding means for carrying out the method steps by preferred embodiments of an apparatus. Likewise, the disclosure of means of an apparatus for carrying out a method step should also disclose the corresponding method step.

Further advantageous exemplary embodiments of the invention can be found in the following detailed description of some exemplary embodiments of the present invention, in particular in connection with the figures. However, the figures should only serve the purpose of clarification and not to determine the scope of protection of the invention. The figures are not to scale and are merely intended to reflect the general concept of the present invention in an exemplary manner. In particular, features comprised by the figures should in no way be regarded as necessary features of the present invention.

DETAILED DESCRIPTION OF SOME EXEMPLARY EMBODIMENTS

Figure 1:
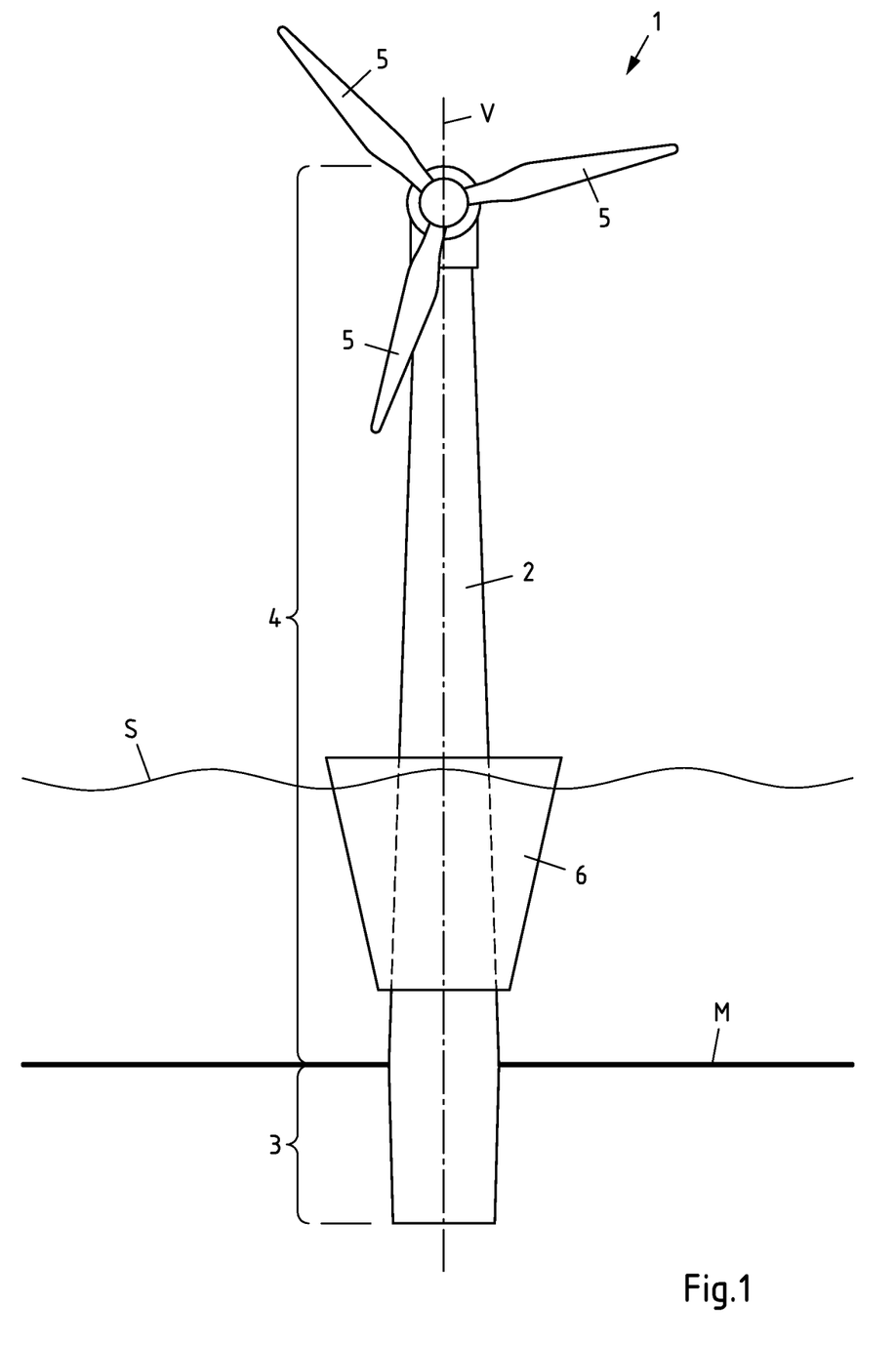
FIG. 1 is a schematic illustration of an offshore structure comprising a foundation according to example embodiments.

FIG. 1 shows a schematic illustration of an offshore structure 1, which is at least partially founded on the seabed 2 by means of a foundation according to the invention.

The offshore structure 1 is a wind turbine, comprising a tower 2, on which at its upper end a power generation system (e.g. a turbine, not shown in the schematic drawing in FIG. 1) with three exciting components, in this case three rotor blades 5, is arranged.

Tower 2 is divided into an anchoring portion 3 and an upper portion 4 above it. Anchoring portion 3 is anchored in the seabed M in this case. Furthermore, the tower comprises a restoring element, in this case an essentially conical-shaped buoyancy body 6, which surrounds the cylindrical tower 2.

In addition to its function of providing lift for the wind turbine, the buoyancy body 6 also ensures that, in the event of a skewed position of tower 2 outside a vertically extending axis V, tensile and/or compressive forces can be transferred to tower 2 by the buoyancy body 6, so that tower 2 straightens up again after a skewed position and thus the direction of longitudinal extending axis of tower 2 is again essentially on the vertically extending axis V. For this, the buoyancy body 6 is located below the water surface S.

Tower 2 is partly founded in the seabed M, and partly it is floating by means of the buoyancy body 6, so it is a "half-floating foundation".

The offshore structure 1, which is founded with a foundation according to the invention, has a natural frequency that lies below an exciting component one times the rotational frequency 1P of the three rotor blades 5 of the power generation system.

The design of the low natural frequency of offshore structure 1 is made possible by the fact that offshore structure 1 is anchored to the seabed M at a low integration depth. Correspondingly, the anchoring of anchoring portion 3 in the seabed M alone cannot completely guarantee the stability of the offshore structure against tipping. The same can happen if the seabed M in which the anchoring portion 3 is anchored is soft, e.g. if it is a (strongly) water-saturated ground. The tilting stability is guaranteed by the restoring element, in this case the buoyancy body 6 which surrounds the tower 2.

Figure 2:
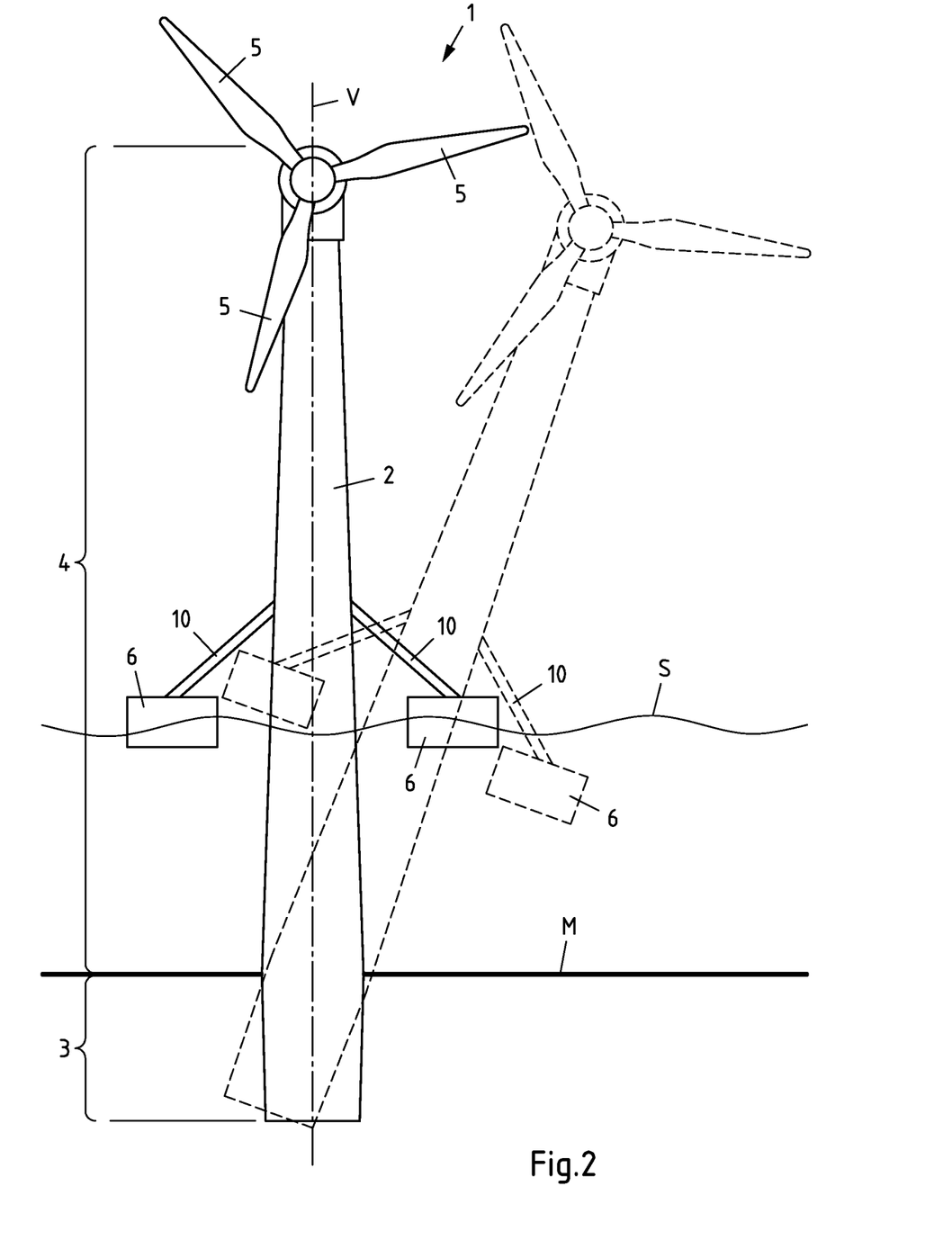
FIG. 2 is a schematic and detailed illustration of an offshore structure comprising a foundation according to example embodiments.

FIG. 2 shows a and detailed illustration of an offshore structure 1, which in contrast to FIG. 1 comprises at least two buoyancy bodies 6, each of which is connected to the tower 2 of offshore structure 1 via a transition piece 10 (e.g. an arm). The buoyancy bodies 6 both float on the water surface S with an orientation of the tower 2, wherein the longitudinal direction of the tower 2 is essentially parallel to the vertical extending axis V.

The anchoring portion 3 of tower 2 is movable within the seabed M when the tower is tilted, as shown schematically in FIG. 2 by the dotted tilting of Tower 2. In the tilted position, the longitudinal direction of tower 2 is outside the vertical extending axis V. If a skewed position of tower 2 occurs, at least one of the two buoyancy bodies at hand is immersed in the water surrounding the tower 2. The submerged buoyancy body 6 now generates a tensile and/or compressive force, which acts in the opposite direction of the skewed position of the tower 2. Tower 2 will then straighten up again.

The anchoring portion 3 of the tower 2, which penetrates the seabed M, can move in the direction of two degrees of freedom within the seabed M. For example, if the tower 2 is in a skewed position, e.g. caused by tilting of the tower 2 or by sea and/or wind load in at least one rotor blade of a power generation system located at the top of the tower (not shown in FIG. 2), such a movement of the anchoring portion 3 of the tower 2 can occur in at least one direction within these two degrees of freedom.

Figure 3A:
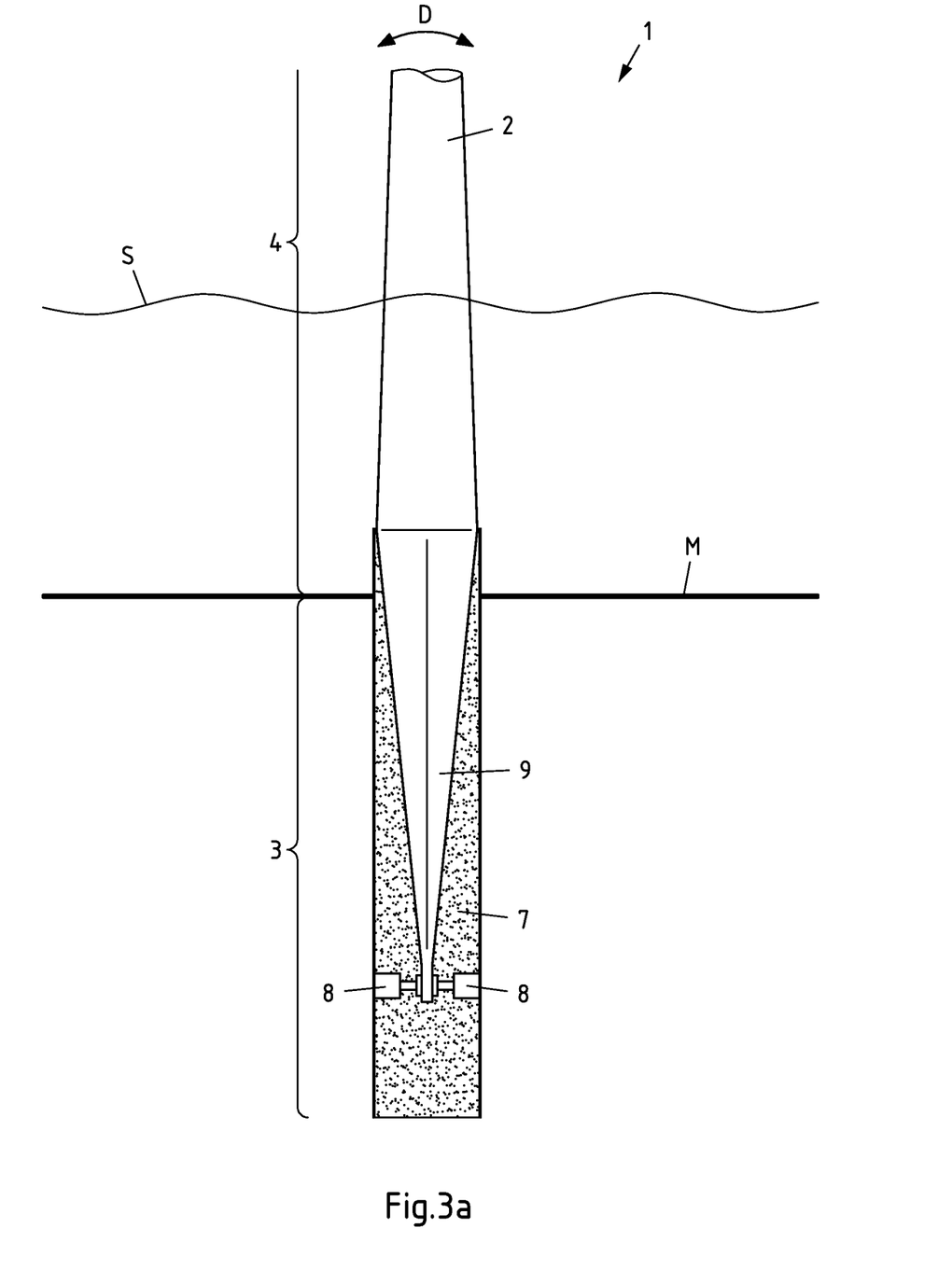
FIGS. 3a-d are respective further schematic and detailed illustrations of an offshore structure comprising a foundation according to example embodiments.

FIG. 3a shows a further schematic and detailed illustration of an offshore structure 1, wherein an upper portion 4 of tower 2 of the offshore structure can be moved in the direction of at least two degrees of freedom within the anchoring portion 3 of the tower 2.

In addition, the upper portion 4 of tower 2 is rotatable relative to the anchoring portion 3 of the tower 2. This is indicated schematically by the double arrow D.

The upper portion 4 of tower 2 engages with a tapered end 9 comprised by it in a receiving area of the anchoring portion 3. This receiving area can be filled, for example, with an elastic filling material 7, such as an elastomer, polymer, sand-clay, sand-clay mixture, to name but a few non-limiting examples.

In addition, the anchoring portion 3 of the tower 2 comprises optional string and/or dampening elements 8 which can spring or damp a skewed position of the tower 2, wherein the upper portion 4 is e.g. tilted in relation to the anchoring portion 3. In addition, by means of the optional string and/or dampening elements 8, a restoring tensile and/or compressive force can be produced when the upper portion 4 of the tower 2 is tilted, which can lead to the upper portion 4 of the tower 2 straightening up after the upper portion 4 of the tower has been tilted.

The anchoring portion 3 of the tower 2 can be open at the bottom, as shown here, so that the anchoring portion 3 can be safely anchored in the seabed M.

Figure 3B:
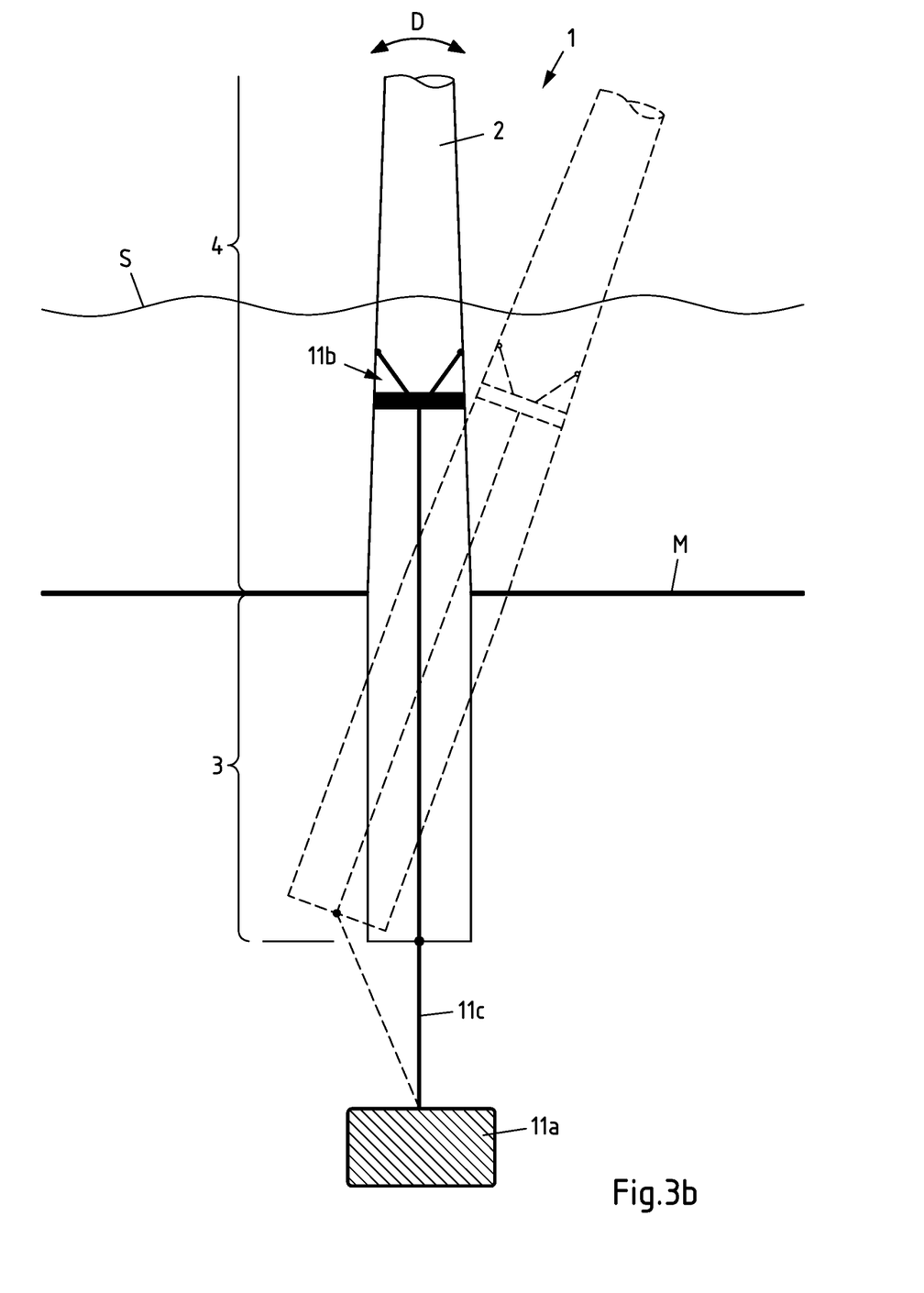

FIG. 3b shows an anchor device 11, which is used as at least one restoring element in the present situation. A weight element 11a is located below the anchoring portion 3 in the seabed M. An anchor rope 11c connects the weight element 11a with a connecting element 11b located inside the upper portion 4 of the tower 2. In the event of a skewed position of the upper portion 4 of tower 2, the anchoring device 11 generates a restoring tensile and/or compressive force which causes the upper portion 4 of tower 2 to straighten up. A skewed position is shown schematically by the dotted tilted tower 2.

Figure 3C:
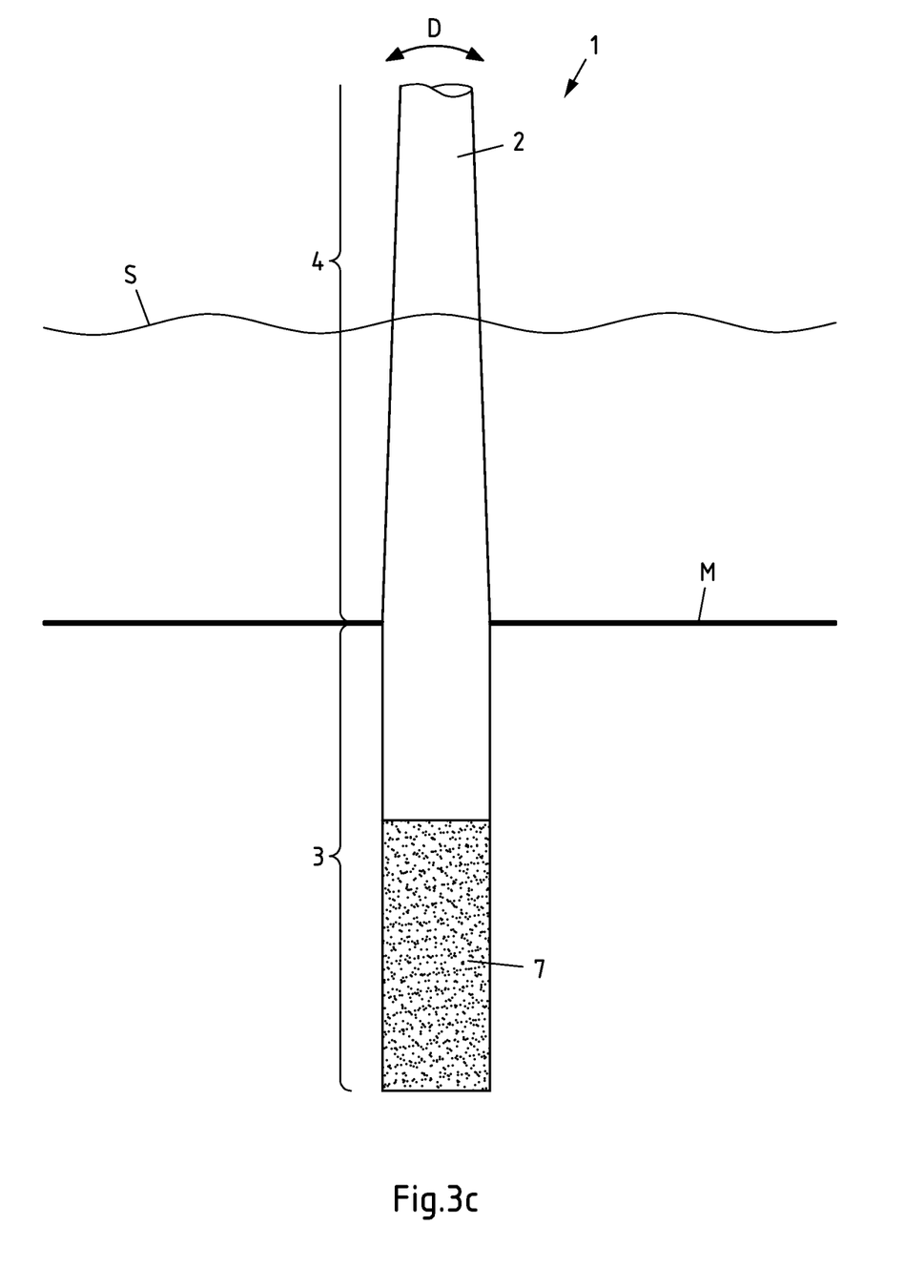

In FIG. 3c the anchoring portion 3 is filled with a filled or grouted volume. This is, for example, a cement suspension enriched, for example, with heavy aggregates and/or comprising steel chips or the like, to name but a few non-limiting examples.

Figure 3D:
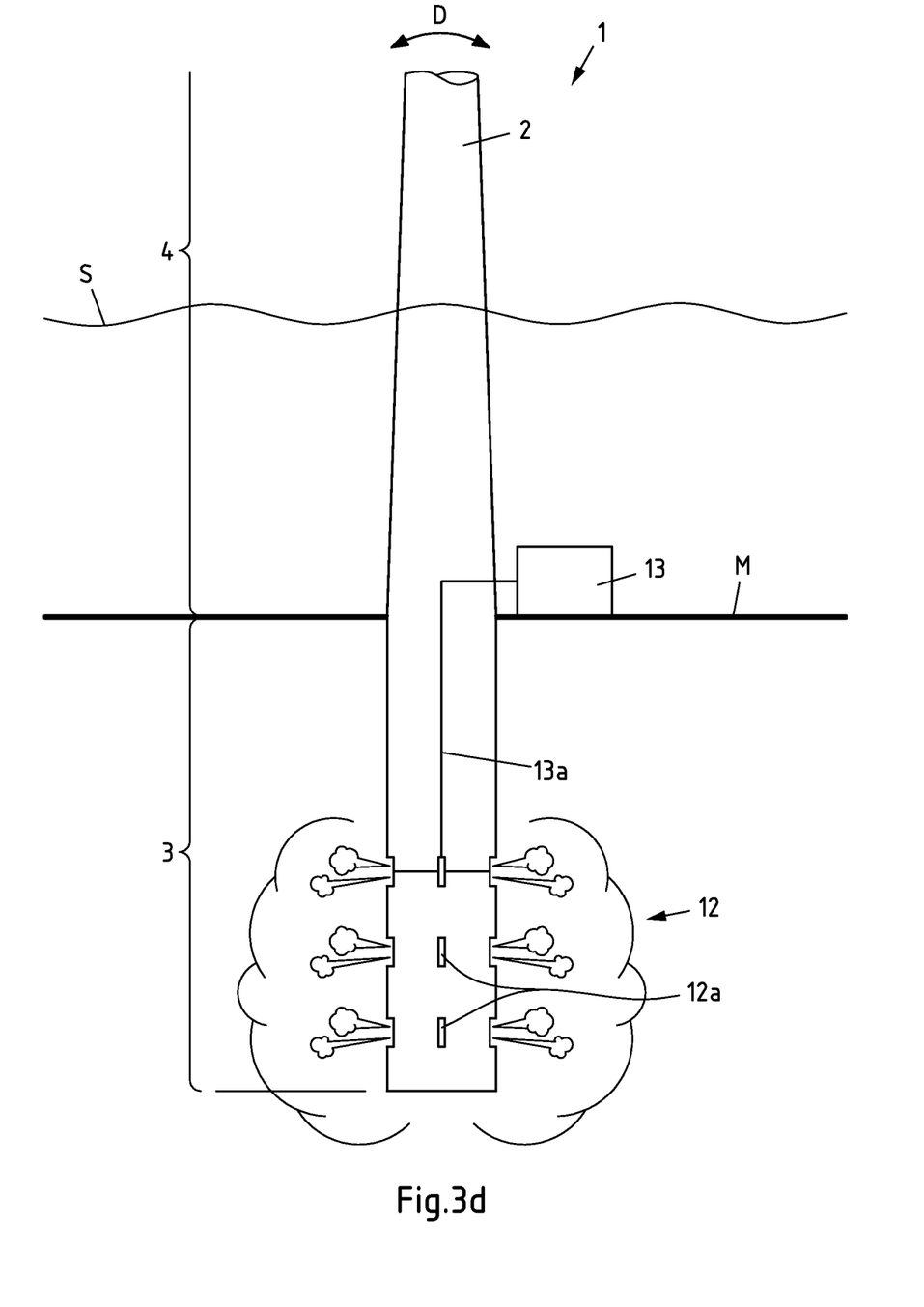

In FIG. 3d the anchoring portion 3 of the tower 2 comprises one or more openings 12a. Through these openings 12a, which are located, for example, in a detached area surrounding the anchoring portion 3 in the seabed M, one or more restoring tensile and/or compressive forces can be generated by hydrostatic suction forces. These can be generated and/or amplified, for example, by active pumping, presently with pump 13. The pump 13 is connected to the openings 12a via one or more pump pipings 13a.

By active pumping or by active pumping of ballast water, a shift of weight can be generated, so that the corresponding restoring forces can be generated if the tower 2 is tilted. Anchoring portion 3, for example, has openings 12a surrounding it at regular intervals. Depending on the skewed position, for example, ballast water can be pumped through one or more openings 12a (simultaneously), so that a corresponding restoring force can be generated by the following directional force, which counteracts the skewed position of tower 2.

Figure 4:
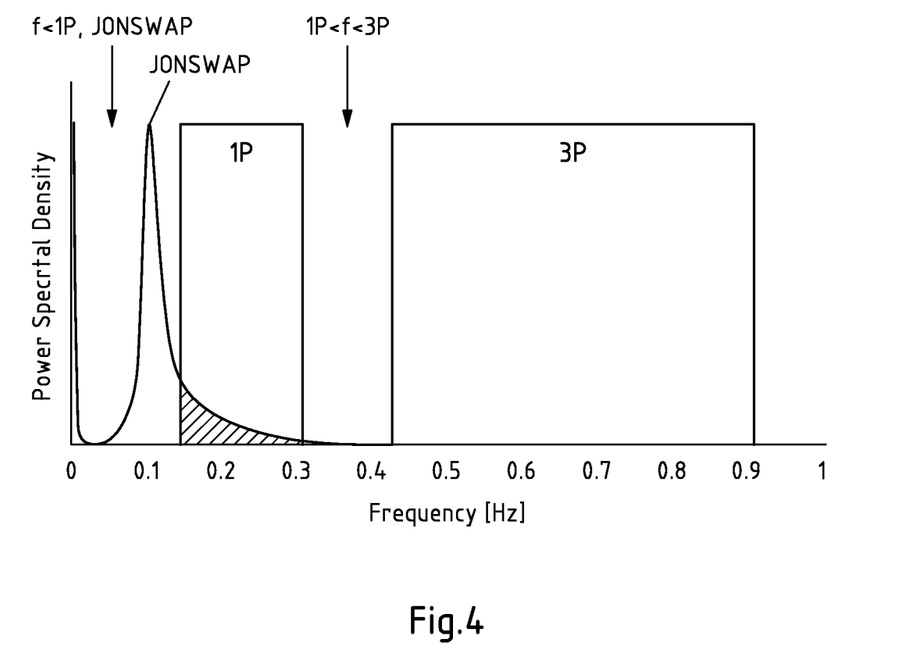
FIG. 4 is a frequency spectrum diagram.

FIG. 4 shows a frequency spectrum diagram, in which exciting component frequencies during operation of a wind turbine are shown.

As already described, for the determining of a natural frequency of an overall system (offshore structure, in particular wind turbine) comprising a foundation that comprises a tower and a power generation system (e.g. with one or more rotor blades), areas within a frequency spectrum can be defined in advance in which the natural frequency should be lying.

For example, a wind turbine experiences a (dynamic) exciting component during operation, in particular from wind loads, from a periodic exciting component with one times the rotational frequency (rotor frequency, 1P exciting component; caused, for example, by imbalances which occur during the rotation of the rotor blades), as well as from a further periodic exciting component from the rotor blade passage with the three times the rotational frequency (3P exciting component; caused, for example, by an inflow of the rotor blade with wind, wherein the rotor blade is located directly in front of the tower).

Furthermore, FIG. 4 shows the so-called JONSWAP spectrum, which represents the wave energy spectrum caused by the sea state in the case of offshore structures and which can also cause an exciting component which the offshore structure has to handle.

The closer the natural frequency of the wind turbine is to these exciting component frequencies, the higher the stress on the mechanical components and the tower can be.

If the first natural frequency of the offshore structure is below the frequency three times the rotational frequency 3P, the design of the offshore structure is referred to as "soft-stiff" (range "target frequency" in FIG. 4). If the design of the offshore structure is also above the frequency of three times the rotational frequency 3P, the design is also referred to as "stiff-stiff". If, on the other hand, the first natural frequency of the offshore structure is below the frequency one times the rotational frequency 1P, the design is called "soft-soft".

It will be understood that when designing the natural frequency of an offshore structure, a design of the natural frequency that lies within the 1P and/or 3P frequency band should be avoided to avoid premature material fatigue and wear.

Figure 5:
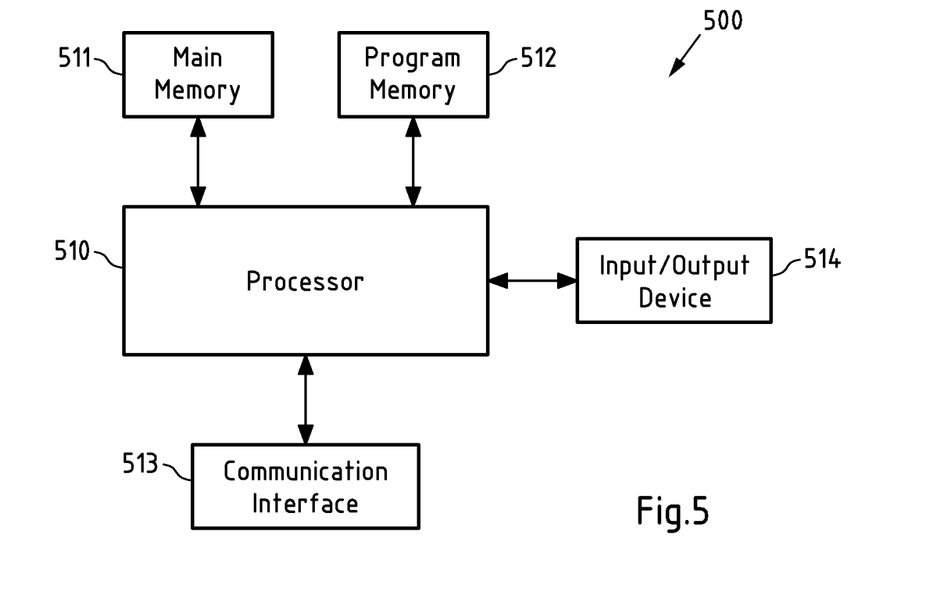
FIG. 5 is a block diagram of an example embodiment of an apparatus, which in particular can execute an exemplary method according to the second aspect.

FIG. 5 shows a block diagram of an example embodiment of an apparatus 500, which can in particular execute an exemplary method according to the second aspect. For example, apparatus 500 is an apparatus according to the third aspect or a system according to the fourth aspect.

Apparatus 500 can therefore be, for example, a computer, a desktop computer, a server, a thin client or a portable computer (mobile device), such as a laptop computer, a tablet computer, a personal digital assistant (PDA) or a smartphone. For example, the apparatus can perform the function of a server or a client.

Processor 510 of the apparatus 500 is in particular designed as a microprocessor, microcontroller, microcontroller, digital signal processor (DSP), application specific integrated circuit (ASIC) or field programmable gate array (FPGA).

Processor 510 executes program instructions stored in program memory 512 and stores, for example, intermediate results or the like in main or working memory 511. For example, program memory 512 is a non-volatile memory such as flash memory, magnetic memory, EEPROM (Electrically Erasable Programmable Read-Only Memory) and/or optical memory. Main memory 511 is for example a volatile or non-volatile memory, in particular a Random Access Memory (RAM) such as a static RAM memory (SRAM), a dynamic RAM memory (DRAM), a ferroelectric RAM memory (FeRAM) and/or a magnetic RAM memory (MRAM).

Program memory 512 is preferably a local data carrier permanently connected to the apparatus 500. Examples of media that are fixed to the apparatus 500 are hard disks that are built into the apparatus 500. Alternatively, the data carrier may, for example, be a data carrier separable connectable to the apparatus 500, such as a memory stick, a removable data carrier, a portable hard disk, a CD, a DVD and/or a floppy disk.

For example, program memory 512 contains the operating system of apparatus 500, which is at least partially loaded into main memory 511 when apparatus 500 is started and is executed by processor 510. In particular, when apparatus 500 is started, at least part of the core of the operating system is loaded into main memory 511 and executed by processor 510. For example, the operating system of apparatus 500 is a Windows, UNIX, Linux, Android, Apple iOS and/or MAC operating system.

In particular, the operating system allows the use of apparatus 500 for data processing. For example, it manages resources such as main memory 511 and program memory 512, communication interface 513, input/output device 514, provides basic functions to other programs via programming interfaces and controls the execution of programs.

Processor 510 controls communication interface 513, which can be a network interface, for example, and can be designed as a network card, network module and/or modem. The communication interface 513 is designed in particular to connect the apparatus 500 to other devices, in particular via a (wireless) communication system, such as a network, and to communicate with them. The communication interface 513 can, for example, receive data (via the communication system) and forward it to processor 510 and/or receive data from processor 510 and send it (via the communication system). Examples of a communication system are a Local Area Network (LAN), Wide Area Network (WAN), Wireless Network (for example, according to the IEEE 802.11 standard, the Bluetooth (LE) standard and/or the NFC standard), wired network, mobile network, telephone network and/or the Internet.

Furthermore, processor 510 can control at least one input/output device 514. For example, input/output device 514 is a keyboard, mouse, display unit, microphone, touch-sensitive display unit, speaker, reader, drive and/or camera. For example, input/output device 514 can receive input from a user and forward it to processor 510 and/or receive and output information for the user from processor 510.

Figure 6:
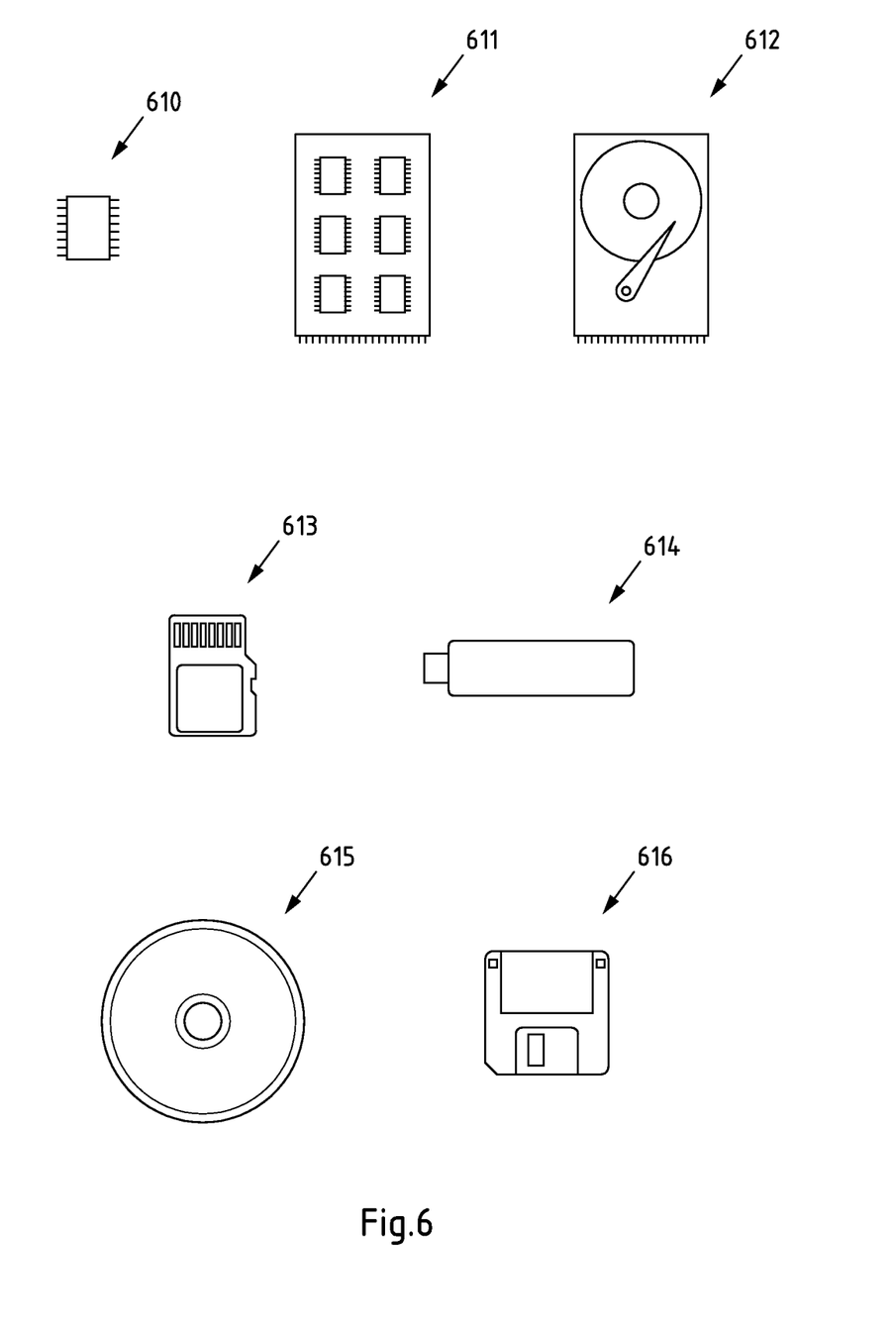
FIG. 6 provides different example embodiments of storage media on which an example embodiment of a computer program can be stored.

Finally, FIG. 6 shows different examples of storage media on which an example of a computer program can be stored. The storage medium can be, for example, a magnetic, electrical, optical and/or other type of storage medium. The storage medium may be part of a processor (e.g. the processor 510 in FIG. 5), for example, a (non-volatile or volatile) program memory of the processor or a part of it (like program memory 512 in FIG. 5). Examples of a storage medium are a flash memory 610, an SSD hard disk 611, a magnetic hard disk 612, a memory card 613, a memory stick 614 (e.g. a USB stick), a CD-ROM or DVD 615 or a floppy disk 616.

The following example embodiments should also be understood to be disclosed:

Embodiment 1

A method for designing a foundation of an offshore structure, comprising:
Determining a natural frequency of the offshore structure comprising a foundation (e.g. according to one of the methods described herein; and optionally e.g. a power generation system), such that the natural frequency lies below an exciting component one times the rotational frequency 1P of at least one exciting component;
wherein the determining of the natural frequency is iteratively based at least partially on changing parameters of the foundation.

Embodiment 2

The method according to embodiment 1, wherein the respectively changing parameters comprise one or more of the following parameters i) to viii):
(i) water depth at the site of the offshore structure;
(ii) weight of power generation system;
(iii) weight of tower;
(iv) total weight of the offshore structure;
(v) vertical stability;
(vi) Stability buoyancy;
(vii) restoring forces; and
(viii) costs of the offshore construction.

Embodiment 3

The method according to embodiment 1 or embodiment 2, wherein the method is carried out by at least one apparatus.

Embodiment 4

An apparatus which is arranged or comprises corresponding means for performing and/or controlling a method according to one of the embodiments 1 to 3.

Embodiment 5

A computer program comprising program instructions which cause a processor to execute and/or control a method according to any one of embodiments 1 to 3 when the computer program is executed on the processor.

Embodiment 6

A system, comprising:
a plurality of apparatus which together perform a method according to one of the embodiments 1 to 3.

The example embodiments of the present invention described in this specification and the optional features and characteristics mentioned in each case in this respect should also be understood as disclosed in all combinations with each other. In particular, unless explicitly stated otherwise, the description of a feature covered by an example embodiment should not be understood in the present case as meaning that the features is essential or essential for the function of the embodiment. The sequence of the method steps described in this specification is not mandatory, alternative sequences of method steps are conceivable. The method steps can be implemented in different ways, e.g. implementation in software (by program instructions), hardware or a combination of both to implement the process steps.

Terms used in the claims such as "comprise", "have", "include", "contain" and the like do not exclude further elements or steps. The expression "at least partially" covers both the "partially" and the "fully" case. The expression "and/or" should be understood as meaning that both the alternative and the combination should be disclosed, i.e. "A and/or B" means "(A) or (B) or (A and B)". The use of the indefinite article does not exclude a plural. A single apparatus can perform the functions of several units or devices mentioned in the claims. Reference signs indicated in the claims are not to be regarded as limitations of the means and steps used.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A foundation for an offshore structure, comprising:
a tower, which has an anchoring portion that can be anchored in the seabed and a connecting portion arranged at the opposite end,
a power generation system that can be arranged above the water surface being able to be connected to the connecting portion of the tower; and
at least one restoring element, the at least one restoring element being able to be connected to the tower directly or indirectly via one or more transition pieces,
wherein a natural frequency of the offshore structure lies below an excitation component one times the rotational frequency 1P of at least one exciting component,
wherein the natural frequency of the offshore structure lies below a frequency of 0.15 Hz, in particular below a frequency of 0.10 Hz, and
wherein the at least one restoring element is designed in such a way that, in the case of a skewed position of the tower, in which the direction of longitudinal extending axis of the tower extends outside of a vertically extending axis, tensile and/or compressive forces can be transferred to the tower by means of the at least one restoring element such that the tower can be straightened up.

2. The foundation according to claim 1, wherein the anchoring portion of the tower that can be anchored in the seabed, engages in the seabed, wherein in the skewed position of the tower the anchoring portion of the tower engaging in the seabed can be moved in the seabed.

3. The foundation according to claim 2, wherein the skewed position of the tower relative to the sea bed, which occurs in a limit state of the load-bearing capacity of the foundation, is greater than 0.10°, in particular greater than 0.20° and in particular greater than 0.5°, and the skewed position after a cyclic loading is greater than 0.05°.

4. The foundation according to claim 1, wherein an upper portion of the tower is movable relative to the anchoring portion of the tower, wherein in the case of a skewed position of the tower, the anchoring portion in the seabed remains substantially in its position.

5. The foundation according to claim 1, wherein the anchoring portion of the tower is essentially hollow cylindrical.

6. The foundation according to claim 4, wherein the upper portion of the tower is movably mounted at least partially within and in a receiving area of the anchoring portion of the tower, wherein in particular the anchoring portion of the tower in the receiving area is filled with a filling material.

7. The foundation according to claim 4, wherein the upper portion of the tower extends conically from the tower within the receiving area of the anchoring portion.

8. The foundation according to claim 4, wherein the receiving area of the anchoring portion of the tower has at least one spring and/or damping element, so that when the upper portion of the tower moves relative to the anchoring portion of the tower, the upper portion of the tower can be sprung and/or damped.

9. The foundation according to claim 1, wherein the at least one restoring element comprises at least one buoyancy body or is designed as at least one buoyancy body, wherein in particular the at least one buoyancy body has a substantially conical or curved geometry.

10. The foundation according to claim 9, wherein the at least one buoyancy body is arranged below the water surface and at least partly surrounding the tower in a horizontal plane.

11. The foundation according to claim 1, wherein the at least one restoring element comprises one or more anchors, the one or more anchors being connectable to the seabed and being connected to the tower in each case by means of a flexible connection, which, when the tower is in a skewed position, generate a restoring tensile and/or compressive force in the opposite direction to the skewed position by tightening the flexible connection.

12. The foundation according to claim 1, wherein the at least one restoring element comprises one or more stabilizing arrangements or is designed as one or more stabilizing arrangements, preferably the one or more stabilizing arrangements being extendable from the tower, or preferably being integrated gyro stabilizers.

13. The foundation according to claim 1, wherein the center of gravity of the offshore structure is designed in such a way that fractions of a ground dead weight and ground friction forces of the seabed to be overcome are below the center of gravity of a liquid displaced by the foundation.

14. An offshore structure comprising a foundation according to claim 1.

* * * * *